United States Patent
Grandjean et al.

(10) Patent No.: US 11,264,143 B2
(45) Date of Patent: Mar. 1, 2022

(54) SOLID NANOCOMPOSITE MATERIAL BASED ON HEXA- OR OCTACYANOMETALLATES OF ALKALI METALS, METHOD FOR PREPARING SAME, AND METHOD FOR EXTRACTING METAL CATIONS

(71) Applicants: COMMISSARIAT À L'ÉNERGIE ATOMIQUE ET AUX ÉNERGIES ALTERNATIVES, Paris (FR); Orano Cycle, Courbevoie (FR)

(72) Inventors: Agnès Grandjean, Saint Marcel de Careiret (FR); Virginie Fremy, Saint-Victor-la-Coste (FR); Alexandre Charlot, Beaulieu (FR); Yves Barre, Uchaux (FR)

(73) Assignees: COMMISSARIAT A L'ÉNERGIE ATOMIQUE ET AUX ÉNERGIES ALTERNATIVES, Paris (FR); ORANO CYCLE, Courbevoie (FR)

( * ) Notice: Subject to any disclaimer, the term of this patent is extended or adjusted under 35 U.S.C. 154(b) by 252 days.

(21) Appl. No.: 16/330,142

(22) PCT Filed: Sep. 6, 2017

(86) PCT No.: PCT/FR2017/052356
§ 371 (c)(1),
(2) Date: Mar. 4, 2019

(87) PCT Pub. No.: WO2018/046844
PCT Pub. Date: Mar. 15, 2018

(65) Prior Publication Data
US 2019/0206583 A1 Jul. 4, 2019

(30) Foreign Application Priority Data
Sep. 8, 2016 (FR) .................... 16 58369

(51) Int. Cl.
*G21F 9/12* (2006.01)
*B01J 20/04* (2006.01)
(Continued)

(52) U.S. Cl.
CPC ............. *G21F 9/12* (2013.01); *B01J 20/04* (2013.01); *B01J 20/28004* (2013.01);
(Continued)

(58) Field of Classification Search
CPC ... G21F 9/12; G21F 9/30; G21F 9/302; G21F 9/305; B01J 20/04; B01J 20/28004;
(Continued)

(56) References Cited

U.S. PATENT DOCUMENTS

2012/0125856 A1* 5/2012 Grandjean .............. G21F 9/305
 210/682
2015/0235721 A1* 8/2015 Grandjean ......... B01D 67/0093
 210/650
(Continued)

FOREIGN PATENT DOCUMENTS

WO 2010/133689 A2 11/2010
WO 2016/038206 A1 3/2016

OTHER PUBLICATIONS

Hitoshi Mimura et al., "Selective removal of cesium from highly concentrated sodium nitrate neutral solutions by potassium nickel hexacyanoferrate(II)-loaded silica gels," Solvent Extraction and Ion Exchange, vol. 17, No. 2, 1999, pp. 403-417.
(Continued)

*Primary Examiner* — Ana M Fortuna
(74) *Attorney, Agent, or Firm* — Pearne & Gordon LLP (57) ABSTRACT

Solid nanocomposite material comprising nanoparticles of a hexacyanometallate or octacyanometallate of an alkali metal and of a transition metal, of formula $[Alk^+_x]M^{n+}[M'(CN)_m]^{z-}$ in which Alk is an alkali metal, x is 1 or 2, M is
(Continued)

a transition metal, n is 2 or 3, M' is a transition metal, m is 6 or 8, z is 3 or 4, attached to at least one surface of a porous inorganic solid support, in which the nanoparticles are attached by adsorption to the at least one surface of the solid support, and in which the surface is a basic surface. Method for preparing this material. Method for extracting at least one metal cation from a liquid medium containing it, wherein the liquid medium is brought into contact with the material.

38 Claims, 1 Drawing Sheet

(51) Int. Cl.
| | |
|---|---|
| *B01J 20/28* | (2006.01) |
| *B01J 20/32* | (2006.01) |
| *C02F 1/28* | (2006.01) |
| *C01C 3/12* | (2006.01) |
| *C01C 3/08* | (2006.01) |
| *C02F 101/00* | (2006.01) |
| *C02F 101/20* | (2006.01) |
| *C02F 103/08* | (2006.01) |

(52) U.S. Cl.
CPC ... *B01J 20/28007* (2013.01); *B01J 20/28057* (2013.01); *B01J 20/3204* (2013.01); *B01J 20/3236* (2013.01); *B01J 20/3295* (2013.01); *C01C 3/08* (2013.01); *C01C 3/12* (2013.01); *C02F 1/288* (2013.01); *C02F 2101/006* (2013.01); *C02F 2101/20* (2013.01); *C02F 2103/08* (2013.01); *C02F 2305/08* (2013.01)

(58) Field of Classification Search
CPC .............. B01J 20/28007; B01J 20/3204; B01J 20/3236; B01J 20/3295; B22F 1/0018; B82Y 30/00; B82Y 40/00; C01C 3/08; C01C 3/12; C02F 1/288; C02F 2101/006; C02F 2101/20; C02F 2103/08
See application file for complete search history.

(56) References Cited

U.S. PATENT DOCUMENTS

| | | | |
|---|---|---|---|
| 2015/0238640 A1 | 8/2015 | Barre et al. | |
| 2015/0307393 A1* | 10/2015 | Guillot ............... | B01J 20/28083 210/660 |
| 2016/0318012 A1 | 11/2016 | Causse et al. | |
| 2017/0260083 A1* | 9/2017 | Grandjean ............... | B01J 39/17 |

OTHER PUBLICATIONS

Leonid Sharygin et al., "A granular inorganic cation-exchanger selective to cesium", Journal of Nuclear Science and Technology, vol. 44 No. 5, 2007, pp. 767-773.
Sanhita Chaudhury et al. "Copper ferrocyanide loaded track etched membrane an effective cesium adsorbent," Journal of Radioanalytical and Nuclear Chemistry. vol. 304, 2015, pp. 697-703.
H. Kazemian et al., "Cs and Sr removal from solution using potassium nickel hexacyanoferrate impregnated zeolites", Journal of Radioanalytical and Nuclear Chemistry, Kluwer Academic Publishers, vol. 268, No. 2, May 2006, pp. 231-236.
Theirry Vincent et al., "Immobilization of metal hexacyanoferrate ion-exchangers for the synthesis of metal ion sorbents—A Mini-Review," Molecules Online, vol. 20, No. 11, Dec. 19, 2015, pp. 20582-20613.
International Search Report for International Application No. PCT/FR2017/052356, dated Dec. 7, 2017.
Written Opinion for International Application No. PCT/FR2017/052356, dated Dec. 7, 2017.
International Preliminary Report on Patentability for International Application No. PCT/FR2017/052356, dated Nov. 13, 2018.
Preliminary French Search Report for Application No. 16 58369, dated Jun. 19, 2017.
Kazemian, H. et al. "Iranian natural clinopptilolite and its synthetic zeolite P for removal of cerium and thorium from nuclear wastewaters" In: Journal of Radioanalytical and Nuclear Chemistry, 2003, vol. 258, No. , pp. 551-556.

* cited by examiner

SOLID NANOCOMPOSITE MATERIAL BASED ON HEXA- OR OCTACYANOMETALLATES OF ALKALI METALS, METHOD FOR PREPARING SAME, AND METHOD FOR EXTRACTING METAL CATIONS

CROSS-REFERENCE TO RELATED APPLICATIONS

This is a National Stage application of PCT international application PCT/FR2017/052356, filed on Sep. 6, 2017, which claims the priority of French Patent Application No. 16 58369, filed Sep. 8, 2016, both of which are incorporated herein by reference in their entireties.

TECHNICAL FIELD

The invention concerns a solid nanocomposite material based on hexa- or octacyanometallates of alkali metals.

These hexa- and octacyanometallates of alkali metals can be called Prussian Blue Analogues or PBAs.

More specifically, the invention pertains to a solid nanocomposite material comprising nanoparticles comprising metal cations, alkali cations, and hexa- or octacyanometallate anions, in particular hexa- or octacyanoferrate anions, said nanoparticles being adsorbed on at least one surface of a solid support.

The nanocomposite solid material based on hexa- or octacyanometallates of alkali metals according to the invention does not comprise an organic ligand and can therefore be considered to be a purely inorganic or inorganic-inorganic material.

The invention also pertains to a method for preparing this material. This method may be defined as a method for functionalizing a solid support with nanoparticles of Prussian Blue Analogues PBAs.

The present invention also concerns a method for separating metal cations, in particular radioactive metal cations contained in a liquid, such as a solution and in particular an aqueous solution, making use of said material.

For example, the material according to the invention may be used for selective adsorption, extraction of radioactive caesium contained in an aqueous solution.

The technical field of the invention may generally be defined as the field of mineral fixers (immobilizing agents).

State of Prior Art

Nuclear facilities such as power reactors, spent nuclear fuel reprocessing plants, laboratories, research centres and liquid effluent treatment plants generate radioactive effluents, notably liquid radioactive effluent.

In particular, the different operations which occur in the nuclear fuel cycle, from mining up until dismantling of end-of-life facilities, generate radioactive effluents and particularly liquid radioactive effluents.

These effluents, of considerable volume, must be treated and decontaminated before discharge into the environment.

The pollutants contained in these effluents and which must therefore be removed are chiefly solid particles and/or radioelements essentially contained in the form of metal cations in solution.

At the current time, the selective extraction, fixing, immobilizing of the radioelements contained in these liquid effluents is generally performed with organic ion exchange resins.

Said resins have at least two disadvantages. First, they have relatively low selectivity and secondly, on account of the irradiating nature of the extracted radioelements, the latter may in some cases cause deterioration of the resins under storage conditions which, under the effect of radiolysis, may release hydrogen.

It is particularly to overcome the defects of organic ion exchange resins that mineral fixing, immobilizing agents have been developed, and thereafter composite fixing, immobilizing agents notably based on Prussian Blue Analogues.

Therefore, to treat effluent containing caesium or radioactive transition metals such as $^{60}Co$, numerous Prussian Blue Analogue-based materials have been proposed in the literature and are commercially available.

In this respect, reference may be made to the prior art set forth in document WO-A2-2010/133689 [1].

In this document, it is specified that composite materials with an inorganic, mineral substrate may be prepared by synthesis via coprecipitation within the substrate, via sol-gel synthesis, via direct synthesis in a porous inorganic support, or via other routes.

Among the documents mentioned in document [1], particular mention may be made of the document by Mimura et al. [2] which proposes a synthesis method whereby nanoparticles of PBAs are inserted via direct route into an inorganic support. The material obtained is used for Cs decontamination by means of a column method.

The synthesis method comprises the successive impregnation of a porous silica gel with solutions of $Ni(NO_3)_2$ and then $K_4Fe(CN)_6$.

First, because there is no prior preparation of the substrate, the quantity of nanoparticles within the material is small. Secondly, since the second impregnation takes place in the absence of a potassium salt, the nanoparticles only contain very little potassium in their structure, leading to lesser selectivity (with a Kd of about $10^4$ ml/g), release of transition metal at the time of Cs extraction, and also to slow kinetics: 2 days are required to reach equilibrium.

With this type of synthesis via coprecipitation within the substrate, the composition of the end product is ill-controlled and the properties thereof scarcely reproducible. The coprecipitation leads to poor control over the amount of deposited hexacyanoferrate, and the hexacyanoferrate fixing, immobilizing agent is weakly bonded to the support. The fixing, immobilizing agent may therefore easily become detached at the decontamination step. This synthesis also systematically employs a large amount of hexacyanoferrate, which is detrimental for the treatment and conditioning of the generated waste.

Another example of this type of hybrid inorganic-inorganic material was proposed in document [3], and marketed.

In this document [3], the description of the synthesis method is succinct, but the obtained materials correspond to dense zirconium hydroxide prepared in the presence of non-stoichiometric potassium nickel-hexacyanoferrate.

The lack of porosity of these materials leads to extremely slow exchange kinetics (equilibrium being reached after several days), which raises problems for a fixed bed method. In addition, since the chemical nature of the particles is non-stoichiometric, nickel is released at the time of Cs extraction. Finally, the synthesis method in this document cannot be transposed to other substrates e.g. grains of different sizes or filtering membranes.

More exactly, document [3] appears to concern the direct synthesis of potassium nickel-hexacyanoferrate within a zirconium hydroxide gel. According to the authors of this article, zirconium hydroxide was chosen for applications to basic solutions, namely having a pH higher than 12. The material obtained, called «Thermoxid-35» is in the form of granules 0.4 to 1 mm in diameter containing approximately 33 weight % $ZrO_2$, 38 weight % water and 28 weight % potassium nickel-hexacyanoferrate.

This material has a porosity with a pore volume of about 0.35 to 0.4 $cm^3/g$ for a pore size of about 6 nm. This composite was tested for adsorption of Cs at concentrations ranging from 0.01 to 2.0 mmol/L in a solution having a pH varying between 6.2 and 9.6 and in the presence of 1 mol/L NaCl. In all cases, Kd values higher than $1.0\ 10^4\ cm^3/g$ were obtained.

Similar to conventional synthesis via coprecipitation, the preparation of composites by coprecipitation in situ via sol-gel route also uses a large amount of hexacyanoferrate, reaching up to 30%, but also a non-negligible amount of water. This may give rise to problems for treatment and conditioning of the generated waste. These large amounts of water may cause the release of hydrogen via radiolysis during storage.

In addition, laboratory tests have shown that the sorption kinetics on «Thermoxid» are very slow since about 300 hours are needed to reach equilibrium.

Finally, optional vitrification of these hexacyanoferrate-rich compounds may lead to release of toxic hydrocyanic acid and which could promote volatilisation of the fixed, immobilized caesium, thereby making decontamination inoperative.

More recently, Chaudhury et al. in document [4] proposed a simple impregnation method to functionalize membranes with Prussian Blue Analogues, here copper ferrocyanide.

For this purpose, the membranes are exposed to two non-connected permeation compartments, one containing an aqueous solution of $CuSO_4$, and the other containing an aqueous solution of $K_4Fe(CN)_6$. When these solutions pass through the membrane, rapid precipitation occurs of a non-stoichiometric copper ferrocyanide within the porosity of the membrane. This simple synthesis route, not using either ligands or organic solvents, allows high Kd values to be reached (of about of $10^5$ ml/g), but does not allow a ferrocyanide to be obtained with potassium ions in the structure, and hence leads to a relatively slow kinetics (a few hours to reach equilibrium). In addition, the absence of stoichiometry in the structure of the ferrocyanide most probably leads to release of Cu in solution. Finally, this route can only be applied to membranes and not to grains which can be used in a fixed bed treatment method.

Document WO-A1-2010/133689 [1], already cited, therefore had the objective of overcoming the disadvantages of the materials described in documents [2], [3] and [4].

This document describes a solid material containing PBA nanoparticles and the preparation method thereof.

More specifically, document WO-A1-2010/133689 [1] describes a solid nanocomposite material comprising nanoparticles of a metal coordination polymer with CN ligands comprising $M^{n+}$ cations, where M is a transition metal and n is 2 or 3; and $[M'(CN)_m]^{x-}$ anions where M' is a transition metal, x is 3 or 4, and m is 6 or 8; said $M^{n+}$ cations of the coordination polymer being bound via an organometallic bond to an organic group of an organic graft chemically attached within the pores of a porous glass support.

Document WO-A1-2010/133689 [1] also relates to a method for preparing said solid nanocomposite material, wherein the following successive steps are carried out:

a) a support made of porous glass is prepared;
b) the organic graft is chemically attached within the pores of the porous glass support;
c) the porous glass support, within the pores of which the organic graft is bonded, is placed in contact with a solution containing the $M^{n+}$ ion, and the support so obtained is washed one or several times and dried;
d) the porous glass support obtained at the end of step c) is placed in contact with a solution of a $[M'(CN)_m]^{x-}$ complex, and the support so obtained is washed one or several times and dried;
e) the porous glass support obtained at the end of step d) is washed one or several times and then dried;
f) optionally, steps c) to e) are repeated.

The solid nanocomposite material of this document and the preparation method thereof have numerous disadvantages.

The support of the solid nanocomposite material of this document is limited to a porous glass support, more exactly to a very specific porous glass support prepared by selective chemical attack of the borate phase of a solid sodium borosilicate glass having a composition lying in the demixing region of the $SiO_2$—$Na_2O$—$B_2O_3$ phase diagram The preparation method described in this document only allows the preparation of a specific material comprising a very specific support, and cannot under any circumstances be transposed to the preparation of materials comprising other supports.

In addition, in this document, on account of the method used to prepare the material, the nanoparticles of hexacyanometallates e.g. hexacyanoferrates bound to the substrate do not contain any alkali metal ions within their structure.

Yet it has been shown, and is well known to the man skilled in the art, that hexacyanoferrates containing an alkali metal in their structure not only have better extraction capacity e.g. of Cs, but also consequently do not lead to release of the transition metal included in the structure of the hexacyanoferrate.

Regarding hexacyanoferrates containing an alkali metal, adsorption of Cs takes place via ion exchange with the alkali metal, such as potassium, whereas if hexacyanoferrates are used without an alkali metal, adsorption of Cs partly takes place via ion exchange with the transition metal contained in the structure of the hexacyanoferrate, consequently leading to release of the transition metal.

With respect to issues regarding disposal standards, release of an alkali metal such as potassium is much more preferable than release of a transition metal such as Co or Ni.

Finally, the synthesis method described in document WO-A1-2010/133689 [1] is relatively complex and generally requires the use of organic solvents such as methanol, and of a controlled atmosphere.

It is only with difficulty therefore that this synthesis method can be implemented on an industrial scale.

The objective of document WO-A1-2016/038206 [5] is to overcome the disadvantages of the method of document [1].

It therefore proposes a method for preparing a solid nanocomposite material comprising PBA nanoparticles containing an alkali metal within the cages of the structure acting as pure ion-exchanger between the alkali metal of the structure and the ion to be extracted.

In other words, the PBA nanoparticles contain an alkali metal cation in their structure which exchanges with the cation in solution to be extracted.

More specifically, document [5] relates to a method for preparing a solid nanocomposite material comprising nanoparticles of a metal coordination polymer with CN ligands, said nanoparticles meeting the formula $[Alk^+_x]M^{n+}[M'(CN)_m]^{z-}$ where Alk is an alkali metal, x is 1 or 2, M is a transition metal, n is 2 or 3, M' is a transition metal, m is 6 or 8, z is 3 or 4; said $M^{n+}$ cations of the coordination polymer being bound via an organometallic or coordination bond to an R2 organic group of an organic graft, and said organic graft also being chemically bound, preferably via a covalent bond, to at least one surface of a solid support via reaction of an R1 group of said graft with said surface; a method in which the following successive steps are carried out:

a) a solid support is provided;

b) the organic graft is chemically attached to the surface of the solid support;

c) the solid support, to the surface of which the organic graft is bonded, is placed in contact with a solution containing the $M^{n+}$ ion, and the grafted solid support thus obtained is washed one or several times and optionally dried;

d) the grafted solid support obtained at the end of step c) is placed in contact with a solution containing a complex or salt of $[M'(CN)_m]^{z-}$ e.g. a salt of formula $[Alk_z][M'(CN)_m]$, and a salt of an alkali metal Alk, and the solid support thus obtained is washed one or several times and optionally dried;

e) steps c) to d) are optionally repeated;

f) if steps c) and d) are the last steps of the method, then during step c) the grafted solid support obtained is washed one or several times and dried, and during step d) the solid support thus obtained is washed one or several times and dried.

It is therefore noted that in the material obtained with the method of this document, the «cation exchanging» nanoparticles of the metal coordination polymer with CN ligands are bound to the support via an organic graft.

The presence of this organic graft between the «cation exchanging» nanoparticles and the support implies a synthesis step conducted at a high temperature having recourse first to an organic solvent and secondly to organic species (i.e. the graft). The use of an organic solvent for manufacture on an industrial scale is coming under increasing prohibition in an effort to reduce environmental impact and to ensure safety at the workplace («ATEX risk»).

The use of a specific organic graft also incurs an increase in production costs, making cost effectiveness difficult to obtain.

Finally, the presence of organic grafts remains a delicate issue regarding choice of the disposal channel for management of the end waste containing the cation, in particular the target radionuclide cation (RN).

Indeed, the presence of organic compounds in this waste may lead to the production of radiolysis gas such as hydrogen, and hence to a more problematic management of the waste under storage conditions.

In the light of the foregoing, there is therefore a need for a solid nanocomposite material comprising nanoparticles of a hexacyanometallate or octacyanometallate of an alkali metal and of a transition metal, which does have the disadvantages, limitations and defects of prior art materials such as described in particular in documents [1], [2], [3], [4] and [5], and more particularly in document [5], and which solves the above-mentioned problems raised by the materials of these documents.

In particular, there is a need for such a material which does not contain a graft, ligand to solve the problem of management of the end waste obtained after use of the material for separation of a pollutant such as a radioactive cation, and also to reduce production costs.

This material must have rapid extraction kinetics, namely a few minutes to reach equilibrium, to allow optimal use in a fixed bed.

The quantity of nanoparticles within said material must be high.

The nanoparticles must be PBA nanoparticles containing an alkali cation in the cages of the structure to act as a pure ion-exchanger between the alkali cation of the structure and a cation to be extracted. The exchange reaction between the material and the pollutant must involve solely the alkali cation, without impacting the other constituent metals of the structure of the nanoparticles.

There is also a need for a method allowing a material to be prepared having the above-mentioned properties and meeting the requirements listed above.

Additionally, this method must meet the following requirements:

it must be able to be implemented on all kinds of supports irrespective of their form and composition;

it must preferably apply steps, particularly synthesis steps, not using organic solvents or controlled atmospheres to limit environmental impact, to reduce risks inherent in industrial production and to reduce production costs inasmuch as is possible;

it must be simple, reliable, reproducible and comprise a limited number of steps;

it must comprise short synthesis steps to reduce production time and hence cost.

It is the goal of the invention to provide such a method and such a material which inter alia meet these needs and these requirements.

SUMMARY OF THE INVENTION

This goal and still others are met, according to the invention, with a solid nanocomposite material comprising nanoparticles of a hexacyanometallate or octacyanometallate of an alkali metal and of a transition metal, having formula $[Alk_x]M^{n+}[M'(CN)_m]^{z-}$ where Alk is an alkali metal, x is 1 or 2, M is a transition metal, n is 2 or 3, M' is a transition metal, m is 6 or 8, z is 3 or 4, attached to at least one surface of a solid inorganic porous support, wherein the nanoparticles are attached by (via) adsorption to said at least one surface of the solid support, and wherein said surface is a basic surface (made basic).

The solid inorganic support is porous, comprises pores, defined by walls, and the nanoparticles are attached by (via) adsorption to a basic inner surface of said walls.

By «attached inside the pores» is generally meant (attached to the inner surface of the walls of the channels defining said pores.

By «at least one basic surface» is meant that the majority and preferably all the surfaces of the support that are accessible (to a basic solution) are basic, or rather have been made basic, including the inner surface of the walls of the channels defining the pores.

To determine whether said surface is basic (has been made basic), the surface of the solid inorganic support may simply be placed in contact with an appropriate colour indicator, in particular a colour indicator specific to the basic pH range (which therefore has a determined, specific colour or determined specific colours in the basic pH range) such as Phenolphthalein, then the colour of the surface obtained after this contacting may be observed, e.g. visually.

It is recalled that Phenolphthalein is of pink colour in a pH range of 9 to 10, and is of a purple colour for a pH higher than 10.

If the colour of the surface obtained after contacting with the colour indicator is the determined, specific colour, or one of the determined specific colours of the indicator in a basic pH range, it can then be considered that the surface of the solid inorganic support is effectively, actually basic, has effectively, actually, been made basic.

It is also possible using an appropriate colour indicator or colour indicators to determine within which specific basic pH range the surface of the solid inorganic support is contained. This is notably of advantage if it is desired that the surface of the solid support should be basic with a specific basicity lying within a determined, specific pH range.

For example, if it is desired that the surface of the solid inorganic support should be basic with a pH of 9 to 10, this surface will be treated with a basic solution so that when this surface is contacted with Phenolphthalein, this surface shows a pink colour (rather light pink in the region of pH 9 or rather dark pink in the region of pH 10) and if it is desired that the surface of the solid inorganic support should be basic with a pH higher than 10, this surface will be treated with a basic solution so that when this surface is contacted with Phenolphthalein, this surface shows a purple colour that is darker and more intense the higher the pH.

According to the invention, the surface of the solid support may be made basic in particular by contacting this surface with at least one basic solution, preferably at least one aqueous basic solution, under agitation, until the pH of this basic solution in contact with the surface is stabilised at a set, determined, desired, pH value, and remains stable at a basic value higher than 7, preferably from 7 to 10.

This contacting may be performed in one operation, one or several times, in several successive contacting operations, the basic solutions used during these successive contacting operations having the same pH values or different pH values, e.g. increasing pH values.

Contacting is generally performed at ambient temperature (namely in general from 15° C. to 30° C., preferably 20° C. to 25° C.), generally without heating and at atmospheric pressure without applying pressure.

By stable pH it is meant that the value of the pH remains stable for a time of a few minutes, for example for a time of the order of 10 minutes.

This basic solution is generally an aqueous basic solution of a mineral base, preferably an aqueous basic solution of NaOH or KOH, more preferably of KOH, at a pH higher than 7, preferably of 9 or higher, preferably of 10 or higher, for example this aqueous basic solution e.g. of KOH may have a pH of 9, 10, or 14. In particular, the aqueous basic solution may be an aqueous basic solution of KOH and the support may then preferably be made of silica.

The basic surface (made basic) of the inorganic, mineral porous support remains an inorganic mineral surface. Apart from the fact that this surface becomes basic due to a reaction taking place on the surface (at the surface) between the basic solution and the inorganic material of the support (e.g. between the mineral base such as KOH and this inorganic material, in particular between KOH and silica), the composition thereof does not undergo any other fundamental modification, and the configuration, form, geometry of this surface is not modified.

According to the invention, the surface of the inorganic support is not made basic via the grafting of a molecule, graft in particular organic, to the surface of the support. The surface made basic remains inorganic, it is not fundamentally modified by the fact that it has been made basic, it does not comprise any organic molecules, grafts or other added elements after the treatment to make it basic.

In other words, the basicity of the surface of the inorganic support is a basicity intrinsic to the inorganic mineral material, such as silica, constituting the support, in particular following the contacting thereof with an aqueous basic solution, such as a KOH solution, and not a basicity due to elements, molecules, in particular organic, that would be attached to, grafted to this inorganic material.

Advantageously, the nanoparticles are uniformly, homogeneously distributed in the pores.

In the formula given above, $Alk^+$ therefore represents a monovalent cation of an alkali metal such as Li, Na or K, being preferred to K.

The formula given above may be written in a simplified manner: $[Alk_x]M[M'(CN)_m]$ where M is in oxidation state 2 or 3, and Alk is in oxidation state 1.

Said nanoparticles may optionally also be called «nanocrystals».

The material according to the invention comprises a combination of characteristics that has never been described or suggested in the prior art, as represented, especially, by the above-cited prior art documents.

According to a first characteristic, the nanoparticles of the material according to the invention are nanoparticles of a specific compound, which is a stoichiometric compound $[Alk^+_x]M^{n+}[M'(CN)_m]^{z-}$, whereas—and this is unanimously confirmed in the literature—a non-stoichiometric compound e.g. of formula $Alk_xM_{1-x}[M^{II}M^{III}(CN)_6]$; $Alk_xM_{1-x}[M^{III}M^{II}(CN)_6]$; $Alk_{2x}M_{1-x}[M^{II}M^{III}(CN)_6]$; $Alk_xM_{1-x}[M^{II}M''^V(CN)_8]$, with x strictly lower than 1, is obtained when this synthesis is performed without the additional adding of a salt of an alkali metal such as a potassium salt, as in the method of the invention described below.

The material prepared by the method according to the invention containing an alkali metal in its structure has better extraction capacity, of Cs for example.

In addition, in the material prepared by the method according to the invention, the ion exchange at the time of extraction, e.g. of caesium, takes place solely with the alkali metal such as potassium, and there is not any release of the metal M or M' included in the structure of the hexacyanoferrate. It is much more advantageous, in particular from the viewpoint of heed of waste disposal standards, to release an alkali metal such as potassium rather than a transition metal.

In other words, the material according to the invention, within the porosity thereof, has PBA particles containing an alkali metal cation in the cages of their structure. On this account, this PBA acts as pure ion-exchanger between the alkali metal cation of the structure and the polluting cation to be extracted such as a caesium cation. The exchange reaction between the material and the polluting cation solely involves the alkali metal cation, without impacting the other constituent metals of the structure of the nanoparticles.

According to a second characteristic, the material according to the invention comprises a solid support having a basic surface, which has been made basic, whereas in the prior art materials such as the materials described in documents [2], [3] and [4], the substrate is not subjected to any prior preparation before binding the nanoparticles, and in particular the support is not basic.

It is this basic nature of the surface of the support which, surprisingly, allows a large quantity of nanoparticles to be attached to the support. In the materials of documents [2], [3] and [4] which inorganic support has not undergone any prior preparation, and in particular is not basic, the quantity of nanoparticles attached to the support is low.

In other words, pre-treatment at basic pH allows the incorporation of a greater quantity of nanoparticles in the porous support. The size of the nanoparticles is determined by the diameter of the pores, and the nanoparticles are therefore blocked in the pores. The attaching of the nanoparticles is mechanical.

According to a third characteristic of the material according to the invention therefore, the nanoparticles are attached by adsorption inside, within the pores of the solid inorganic porous support.

In the material according to the invention, the nanoparticles are therefore not attached to the inorganic support via an organic ligand, graft.

This is the essential difference between the material according the invention and the material of document [5]. The disadvantages of the material of document [5], due to the presence of this organic graft, are therefore eliminated.

Therefore, the absence of an organic graft, ligand in the material according to the invention particularly allows solving of management problems regarding the end waste (comprising a radio-isotope) and reducing the production costs.

It can be said that the material according to the invention has all the advantages of the material of document [5] without having the disadvantages thereof notably due to the presence of a graft.

Although they are not bonded to the inorganic support via an organic ligand, the nanoparticles are nevertheless securely attached to the support and the nanoparticle content of the material according to the invention is high and comparable with that of the material of document [5].

As will be seen below, the absence of an organic graft also largely simplifies the method for preparing the material according to the invention, in particular compared with the method of document [5].

Advantageously, the nanoparticles content of the material according to the invention is 1 mass % to 20 mass %, preferably of about 10 mass % relative to the mass of the solid support.

Another property of the material according to the invention is that it has rapid extraction kinetics, lasting only a few minutes e.g. 5 to 10 min to reach equilibrium. This enables optimal use of the material in a fixed bed.

Finally, the material according to the invention meets all the above-mentioned needs and requirements.

In the formula given above, Alk may be Li, Na or K, preferably Alk is K.

Advantageously, $M^{n+}$ may be $Fe^{2+}$, $Ni^{2+}$, $Fe^{3+}$, $Co^{2+}$, $Cu^{2+}$ or $Zn^{2+}$.

Advantageously, M' may be $Fe^{2+}$ or $Fe^{3+}$ or $Co^{3+}$, and m is 6.

Advantageously, M' may be $Mo^{5+}$, and m is 8.

Advantageously, $[M'(CN)_m]^{z-}$ may be $[Fe(CN)_6]^{3-}$, $[Fe(CN)_6]^{4-}$, $[Co(CN)_6]^{3-}$ or $[Mo(CN)_6]^{3-}$.

Advantageously, the $M^{n+}$ cations may be $Ni^{2+}$, $Cu^{2+}$, $Fe^{2+}$ or $Fe^{3+}$ cations, and the $[M'(CN)_m]^{z-}$ anions may be $[Fe(CN)_6]^{3-}$ or $[Fe(CN)_6]^{4-}$ anions.

Advantageously, the $M^{n+}$ cations may be Fe cations and the $[M'(CN)_m]^{z-}$ anions may be $[Mo(CN)_8]^{3-}$ anions.

Advantageously, the $M^{n+}$ cations may be $Co^{2+}$ or $Ni^{2+}$ cations, and the $[M'(CN)_m]^{z-}$ anions may be $[Co(CN)_6]^{3-}$ anions.

Preferably, the nanoparticles meet the formula $K[Cu^{II}Fe^{III}(CN)_6]$, or $K_2[Cu^{II}Fe^{II}(CN)_6]$, or $K[Ni^{II}Fe^{III}(CN)_6]$ or $K_2[Ni^{II}Fe^{II}(CN)_6]$.

Advantageously, the nanoparticles may have the form of a sphere or of a spheroid.

The nanoparticles generally have a size e.g. diameter of 3 nm to 30 nm.

It is to be noted that the nanoparticles generally have uniform size and shape throughout the support.

Advantageously, the support comprises, preferably consists of, a material selected from among metal oxides such as oxides of transition metals e.g. titanium oxides, zirconium oxides e.g. zirconia, niobium oxides, vanadium oxides, chromium oxides, cobalt oxides and molybdenum oxides, aluminium oxides e.g. alumina, gallium oxides and mixtures thereof; metalloid oxides such as silicon oxides e.g. silica, germanium oxides, antimony oxides and arsenic oxides, and mixtures thereof; mixed oxides of metals and/or metalloids; metal aluminosilicates; metal silicates such as zirconium silicates, tin silicates, cerium silicates, compounds of mullite type (aluminium silicate) and cordierite type (aluminous ferromagnesian silicate), and mixtures thereof; metal titanates such as tialite, metalloid titanates, and mixtures thereof; metal carbides; metalloid carbides such as SiC, and mixtures thereof; mixtures of metal oxides and/or metalloid oxides and/or of mixed oxides of metals and/or metalloids; glasses such as borosilicate glasses; carbons (inorganic) such as graphite, fullerenes, and mesoporous carbons; and composite materials comprising two or more materials among the above-cited materials.

The support may be a form selected from among particles such as granules, beads, fibres, tubes such as carbon nanotubes, plates and flakes; membranes; felts and monoliths.

Advantageously, the support is in the form of a powder consisting of particles such as beads, with a particle size of 0.5 mm to 1 mm.

Advantageously, the support has a BET specific surface area of 5 to 500 m$^2$/g, preferably 50 to 500 m$^2$/g, more preferably 100 to 200 m$^2$/g.

A support with a large specific surface area allows optimization of the quantity of nanoparticles inserted within the support.

The invention further concerns a method for preparing the material according to the invention, wherein the following successive steps are carried out:

a) a solid support is provided;

b) at least one surface of the solid support is made basic (preferably all the surfaces of the solid support);

c) the solid support of which at least one surface has been made basic is placed in contact with a solution, preferably an aqueous solution, containing the $M^{n+}$ ion, and then the solid support obtained is washed one or several times with water and optionally dried;

d) the solid support obtained at the end of step c) is placed in contact with a solution containing a salt of $[M'(CN)_m]^{z-}$, e.g. a salt of formula $[Alk_z]$ $[M'(CN)_m]$, and a salt of an alkali metal Alk, and then the solid support thus obtained is washed one or several times with water and optionally dried;

e) steps c) to d) are optionally repeated.

f) If steps c) and d) are the last steps of the method, then during step c) the solid support obtained is washed one or several times with water, and during step d) the solid support thus obtained is washed one or several times and dried.

The method of the invention comprises a specific sequence of specific steps which has never been either described or suggested in the prior art.

In particular, the method of the invention differs fundamentally from the method described in document [5] through the fact that it no longer comprises any chemical bonding step of an organic graft on, to the surface of the solid support.

According to the invention, this step is replaced by a step at which at least one surface of the solid support is made basic.

All the disadvantages related to the presence of an organic graft, ligand in the end material are therefore eliminated.

Step b) of the method according to the invention is much simpler, much more reliable, more rapid and of lower cost than the chemical bonding step of an organic graft on, to the surface of the solid support in the method of document [5].

It is further to be noted that this step b) is particularly well suited for oxide surfaces.

The method of document [5] is considerably simplified whilst allowing a material to be obtained having the same properties.

The method of the invention is also defined in that during step d), the solid support obtained at the end of step c) is placed in contact with:

a solution containing a salt of $[M'(CN)_m]^{z-}$ (z=3 or 4), e.g. a salt of formula $[Alk_z]\ [M'(CN)_m]$, and further, a salt of an alkali metal Alk, and not a solution only containing a salt of $[M'(CN)_m]^{z-}$, e.g. a salt of formula $[Alk_z]\ [M'(CN)_m]$.

Evidently, the salt of an alkali metal Alk that is additionally added, different, distinct from the salt of $[M'(CN)_m]^{z-}$, e.g. the salt of formula $[Alk_z]\ [M'(CN)_m]$.

It is to be noted that the type of $[M'(CN)_m]^{z-}$ salt is not of importance nor the quantity of alkali metal added when dissolving the salt of $[M'(CN)_m]^{z-}$ (cyanate salt) in solution. It is effectively the fact that an alkali metal salt is added in addition to the cyanate salt—whether or not the latter is an alkali metal salt—which leads to obtaining the desired structure according to the invention such as described above.

Through the addition of an alkali metal salt during this step of the method according to the invention, it is possible, in a reliable, definite, and reproducible manner to obtain the stoichiometric compound such as previously defined: $[Alk^+_x]M^{n+}[M'(CN)_m]^{z-}$, whereas—and this is unanimously confirmed in the literature—a non-stoichiometric compound e.g. of formula $Alk_xM_{1-x}[M^{II}M^{III}(CN)_6]$; $Alk_xM_{1-x}[M^{III}M^{II}(CN)_6]$; $Alk_{2x}M_{1-x}[M^{II}M^{II}(CN)_6]$; $Alk_xM_{1-x}[M^{II}M^{IV}(CN)_8]$ with x strictly lower than 1 is obtained when this synthesis is carried out without further addition of an alkali metal salt such as a potassium salt.

The method of the invention does not have the disadvantages, defects, limitations and shortcomings of prior art methods, and it brings a solution to the problems of prior art methods such as those described in the above-cited documents.

In particular, as already mentioned above, the method of the invention—on account of its specific step b)—does not have the disadvantages, defects, limitations and shortcomings of the method of document [5], and it brings a solution to the problems of the method described in this document.

The method of the invention is globally, as a whole, simple, has recourse to known, proven processes and is reliable and fully reproducible. Indeed, it allows the preparation of an end product whose characteristics, composition—notably regarding the alkali metal stoichiometry—and properties are clearly determined and do not undergo random variations.

The method of the invention has low impact on the environment, in particular since it generally does not use organic solvents but only water, and generally does not have recourse to controlled atmospheres, and generally does not use heating.

The method of the invention comprises a limited number of simple steps, and the steps of this method, in particular the synthesis steps, are short, namely lasting a time that does not exceed a few hours (e.g. 20 min to 2 hours). The overall duration of the method is therefore short, e.g. 3 to 48 hours depending on the number of cycles, and at all events is shorter than the time of the method of document [5].

The method of the invention may be implemented with all kinds of supports irrespective of their shape, size, quantity, type.

The material prepared by the method according to the invention, in particular on account of the specific step b) thereof, has all the advantageous properties listed above.

Advantageously, during step b), at least one surface of the solid support is placed in contact one or several times with at least one basic solution, preferably at least one aqueous basic solution, preferably under agitation, until the pH value of the basic solution in contact with the surface is stabilised, stable and remains stable at a basic value (desired, set, determined), preferably under agitation, whereby a solid support is obtained having at least one surface that has been made basic, and then the solid support is separated from the basic solution, and optionally the solid support having at least one surface that has been made basic is dried.

By stable pH it is meant that the pH value remains stable for a time of a few minutes e.g. for a time of about 10 minutes.

Said at least one basic solution is generally an aqueous basic solution of a mineral base, preferably an aqueous basic solution of NaOH or KOH, more preferably KOH, at a pH higher than 7, preferably of 9 or higher, preferably of 10 or higher, for example this aqueous basic solution e.g. of KOH, may have a pH of 9, 10 or 14. This contacting may be performed one time or several times, successively in several successive contacting operations, the basic solutions used for these successive contacting operations having the same pH of different pH values, for example increasing pH values.

The pH of the basic solution is generally continuously monitored and adjusted.

More exactly, the contacting of the basic solution with the solid support may be conducted by adding said basic solution, preferably dropwise, to a suspension, dispersion, containing the solid support and monitoring, preferably continuously, the pH of the mixture of the basic solution and of the suspension, dispersion. The addition of the basic solution is halted when the pH of the mixture of the basic solution and of the dispersion reaches a required, desired basic value, and is stabilised at a required, desired basic value.

Contacting is generally conducted at ambient temperature (namely in general 15° C. to 30° C., preferably 20° C. to 25° C.), generally without heating and at atmospheric pressure, generally without applying pressure.

The desired stable basic pH value of the basic solution is dependent on the type of metal M, and is generally 7 to 10, for example 9, 10 or 11. For copper, for example, it is 9.

Advantageously, the solution containing the $M^{n+}$ ion is an aqueous solution of one or several salts containing the $M^{n+}$ ion.

Advantageously, the solution containing a salt of $(M'(CN)_m)^{z-}$, e.g. a salt of formula $[Alk_z]\ [M'(CN)_m]$, and a salt of an alkali metal Alk, is an aqueous solution.

Preferably, washes are conducted using water, in particular ultra-pure water.

Advantageously, steps c) and d) are performed in a static or batch mode, or else in a dynamic mode, for example in one same column.

Advantageously, steps c) and d) may be repeated 1 to 10 times, preferably 1 to 4 times.

By varying the number of times that the succession of steps c) and d) is repeated, it is easily possible to modulate the extracting capacity of the material prepared with the method of the invention.

The material according to the invention may notably be used, but not exclusively, in a method for extracting, separating at least one metal cation from a liquid medium in which it is contained, wherein said liquid medium is placed in contact with the material according to the invention.

The invention therefore also concerns said extraction method.

The materials of the invention, on account of their excellent properties such as excellent exchange capacity, excellent selectivity, fast reaction rate, are particularly suitable for said use.

This excellent efficacy is obtained with reduced amounts of solid inorganic cation exchanger material, such as an insoluble hexacyanoferrate.

In addition, the excellent properties of mechanical strength and stability of the material according to the invention, resulting from its specific structure, allow packing thereof in a column and continuous implementation of the separation method, which can therefore easily be integrated in an existing installation, for example a treatment chain or line comprising several steps.

Advantageously, said liquid medium may be an aqueous liquid medium such as an aqueous solution e.g. a seawater or a brackish water.

The solutions that may be treated with the material according to the invention are most varied, and may even contain corrosive or other agents for example, owing to the excellent chemical stability of the material according to the invention.

The material according to the invention may particularly be used over a very broad pH range, for example from 2 to 10. For example, it is possible to treat acid solutions (e.g. solutions of nitric acid), for example at concentrations higher than 0.1 M, and neutral or basic solutions up to a pH of 10.

Said liquid may be a processing liquid or an industrial effluent.

Advantageously, said liquid medium may be a liquid medium such as an aqueous solution containing radionuclides. For example, the liquid medium may be selected from among liquids and effluents derived from the nuclear industry, nuclear plants and activities using radionuclides.

Amongst these, mention may be made for example of cooling waters and radioactive effluent from the operation or remediation/dismantling of nuclear plants, radioactive aqueous solutions and effluents from operating activities or remediation/dismantling activities of nuclear fuel-cycle plants, from mining up until dismantling of end-of-life installations, or radioactive aqueous solutions and effluents from laboratories, research centres or other industries using radionuclides.

However, the material according to the invention may evidently be used in other fields of activity whether industrial or others, non-nuclear.

For example, hexacyanoferrates selectively immobilize thallium and this property could be used to advantage for the purification of effluents from cement works to reduce or prevent discharge and emission of this element which is a violent poison.

The liquid medium, preferably an aqueous solution, apart from said metal cation to be separated, may contain other salts in solution such as $NaNO_3$ or $LiNO_3$ or else $Al(NO_3)_3$ or any other soluble salt of an alkali or alkaline-earth metal, for example at concentration that may reach up to 2 moles/L. The solution, as indicated above, may also contain acids, bases and even organic compounds.

The liquid medium may therefore be an aqueous solution which, further to said metal cation, contains salts (evidently differing from the salts of said metal cation) such as NaCl for example at a concentration higher than 30 g/L.

The method of the invention surprisingly allows the efficient and selective separation of a metal cation such as a caesium cation, even from liquid media, such as aqueous solutions, highly loaded with salts, in particular NaCl. Said media with high NaCl content are seawaters and brackish waters, for example.

In general, said metal cation may be present at a concentration of 0.1 picogram to 100 mg/L, preferably from 0.1 picogram to 10 mg/L.

The term «metal» also covers the isotopes and in particular the radioactive isotopes of said metal.

Preferably, the cation is a cation of an element selected from among Cs, Co, Ag, Ru, Fe and Tl and the isotopes thereof, radioactive isotopes in particular, among which mention may be made of $^{58}Co$, $^{60}Co$, $^{55\text{-}59}Fe$, $^{134}Cs$, $^{137}Cs$ and $^{103,105,105,107}Ru$.

In particular, the metal cation is the caesium cation Cs.

More preferably, the cation is a cation of $^{134}Cs$ or $^{137}Cs$.

One preferred use of the material prepared by the method according to the invention is the fixing, immobilization of caesium which makes a large contribution to the gamma activity of liquids from the nuclear industry and is selectively fixed, immobilized by hexacyanoferrates.

The method according to the invention may advantageously be implemented with a liquid medium which is an aqueous solution containing as metal cation a cation of $^{134}Cs$ or $^{137}Cs$, and further containing salts such as NaCl, preferably at a high concentration, e.g. higher than 30 g/L.

The method of the invention allows the efficient, selective separation of these metal cations of radioactive caesium from such liquid media highly loaded in salts such as NaCl. This efficient, selective separation is possible because of the selectivity of the material according to the invention vis à vis Cs in the presence of a competitive ion such as Na.

This method has all the advantages intrinsically related to the material according to the invention, used in this method, and which have already been described above.

It has been seen that the separation method using the material prepared by the method according to the invention is preferably used under continuous operation, the nanocomposite material prepared by the method according to the invention preferably in particle form, then being packed as a column for example, the material preferably forming a fluidized bed which fluidization is ensured by the solution to be treated, but the fixing, immobilizing method may also be carried out in batch mode, the contacting of the exchanger material and of the solution to be treated then preferably being conducted under agitation. Packing in a column allows continuous treatment of large quantities of solution with a high flow rate thereof.

The contact time of the solution to be treated with the material prepared by the method according to the invention is variable and may range for example from 1 minute to 1 hour for continuous operation, and for example from 10 minutes to about 24 hours for batch operation.

On completion of the fixing, immobilizing method, the pollutants in the solution, such as cations are immobilized in the solid nanocomposite immobilizing, fixer, (exchanger) material according to the invention via sorption i.e. via ion exchange or adsorption in the nanoparticles, within the structure of the nanoparticles, themselves attached to the surface of the solid support.

The invention will now be described in more detail in the following, in particular in connection with particular embodiments thereof that are the subject of examples.

This description is given with reference to the appended drawings.

BRIEF DESCRIPTION OF THE DRAWINGS

The breakthrough curve gives the concentration of Cs at the column outlet (in mg/L) as a function of the volume having passed through the column (V in mL): this was done with regular sampling at the column outlet and analysis of the cations in solution is then carried out.

DETAILED DESCRIPTION OF PARTICULAR EMBODIMENTS

The first step of the method according to the invention consists in providing a solid support.

There are no particular limitations as to the type of constituent material(s) of this solid support.

In general, this support is made of one or more inorganic, mineral, materials.

Preferred materials were cited above.

There is no limitation as to the structure of the support and as to the constituent material thereof.

Thus, the support is generally porous.

It is first specified that the term «porous» such as used in the present invention relating to the support, means that this support contains pore or voids.

Therefore, the density of this porous support is lower than the theoretical density of the same support that is non-porous and termed a solid material.

The pores can be connected or isolated, but in the porous support according to the invention the majority of the pores are connected, communicate. In this case the terms open porosity or interconnected pores are used, but the method of the invention may also be implemented with a porous support not having interconnected pores.

In general, in the support according to the invention, the pores are percolating pores connecting a first surface of said support with a second main surface of said support.

In the meaning of the invention, a support is generally considered to be porous if its density is at most of about 95% of the theoretical density thereof.

The porosity of the support may vary within broad limits, and may generally vary from 25% to 50%.

Porosity is generally measured via nitrogen adsorption-desorption or using a mercury porometer.

The support used in the method of the invention may possibly have only one type of porosity e.g. microporosity, mesoporosity or macroporosity.

Or else the support used in the method of the invention may simultaneously have several types of porosities selected for example from among microporosity (pore size e.g. diameter generally less than 2 nm), mesoporosity (pore size e.g. diameter of 2 to 20 nm), and macroporosity (pore size e.g. diameter larger than 20 nm, e.g. up to 100 nm).

The porosity may or may not be ordered, organized, structured e.g. mesostructured.

There is also no limitation as to the size of the support, and the support size may vary between wide limits.

Thus, the support may be a support of nanoscopic size i.e. of a size (defined by its largest dimension) of 50 nm to 100 nm, a microscopic support i.e. of a size of 100 nm to 1 mm, or a macroscopic support i.e. of a size larger than 1 mm.

The support may have all kinds of forms as already described above.

For example, the support may be in the form of particles such as spheres (beads) or spheroids, fibres, tubes in particular carbon nanotubes, or plates.

However, to allow use of the support in a continuous extraction method implemented in a column in particular, it is generally preferred that the support be in the form of particles forming a powder. It is additionally preferred that this powder has a particle size which reduces potential head losses. An ideal particle size is 0.5 mm to 1 mm.

Particle size is defined by their largest dimension which is the diameter for spheres or spheroids.

Another preferred form for the support and which also allows reduced head loss (for flow operation) is the form of monoliths generally having a size of at least 5 mm and containing macropores.

Advantageously, the support has a BET specific surface area of 50 to 500 $m^2/g$, preferably of 100 to 200 $m^2/g$ measured by nitrogen adsorption-desorption or mercury porosimetry.

In the prior art methods, such as the method of document [5], the support is generally washed, e.g. with ultra-pure water one or several times and then dried e.g. in an oven at a temperature of 120° C. for 24 hours before performing the other steps of the method. In the method according to the invention, there is no reason for this preparation of the support by washing and drying, and they are not necessary.

In a first step, at least one surface of the support is made basic.

Advantageously, the support is placed in contact with a basic solution, preferably an aqueous basic solution.

This contacting of the support with the basic solution may be carried out in dynamic mode i.e. the solid support is placed in contact with a stream of the solution circulating in an open circuit.

Or else, contacting may be carried out in batch mode under agitation.

The total contacting time is generally of about 2 hours.

For example, it is possible to place the solid support in an aqueous basic solution contained in a vessel. The contacting time (in batch mode under agitation) is very short (instantaneous or near-instantaneous) and is solely used to wet the support.

To this aqueous solution a concentrated basic solution is progressively added, preferably a KOH solution of pH 13. Throughout this addition, the pH of the solution in contact with the support is measured and the addition is halted when the pH of the solution in contact with the support is stable at a set, desired value e.g. between 8 and 10, and when this pH remains stable at this desired value for a time of 10 to 15 minutes, for example 10 minutes.

This step is of short duration e.g. of about 2 hours.

At the end of this step, the solid support is separated from the solution (e.g. by filtration or decanting) and, without any other treatment being required, the solid support is placed in contact with the aqueous solution containing the $M^{n+}$ salt.

At the end of this first step, a solid support is therefore obtained having one surface that has been made basic.

Preferably, all the accessible surfaces of the support are made basic.

The steps that will now be described to prepare nanoparticles on a surface made basic of the solid support are substantially similar to those of the method described in document WO-A1-2016/038206 [5]. In particular, according to the invention, during step d) the solid support obtained at the end of step c) is placed in contact with a solution containing a salt of $(M'(CN)_m)^{z-}$, for example a salt of formula $[Alk_z] [M'(CN)_m]$, and also a salt of an alkali metal Alk differing from the complex, and not with a solution only containing a complex or salt of $(M'(CN)_m)^{z-}$, e.g. a salt of formula $[Alk_z] [M'(CN)_m]$.

Reference may therefore be made to this document in particular with respect to the reagents and operating conditions employed in these steps, but also for the description of the nanoparticles.

In a second step, the nanoparticles are therefore grown on said surface, made basic, of the solid support.

This growth is obtained in two successive steps, optionally repeated.

These are steps c) and d) of the method according to the invention, the succession of which amounts to what may be called an impregnation cycle, said cycle optionally being repeated.

The solid support of which one surface has been made basic is first placed in contact with an aqueous solution containing the $M^{n+}$ ion, generally in the form of a metal salt.

The solvent of this solution is therefore water and preferably ultra-pure water.

The metal salt contained in this solution is a salt of a metal generally selected from among metals able to give a cyanometallate of this metal, such as a hexacyanoferrate of this metal, which is insoluble.

This metal may be selected from among all transition metals e.g. from among copper, cobalt, zinc, nickel and iron etc. The $M^{n+}$ ion may therefore be selected from among $Fe^{2+}$, $Ni^{2+}$, $Fe^{3+}$, $Co^{2+}$, $Cu^{2+}$ and $Zn^{2+}$ ions.

For example, the metal salt may be a nitrate, a sulfate, a chloride, an acetate, a tetrafluoroborate, optionally hydrated, of one of these metals M.

For example, it may be copper nitrate.

The concentration of the metal salt in the solution is 0.01 to 1 mol/L, more preferably 0.1 to 0.5 mol/L.

The amount of salt used is preferably about 0.1 to 1 mmol/g of treated solid support.

The contacting, that may also be qualified as impregnation of the solid support, is generally conducted at ambient temperature, and generally lasts 4 to 96 hours.

This contacting may be performed in static mode also called batch mode, preferably under agitation, in which case it generally lasts 12 to 96 hours, or else in dynamic mode (in a fixed or fluidized bed) in which case it generally lasts 4 to 24 hours.

At the end of this contacting, a solid support is obtained in which the $M^{n+}$ cations are adsorbed on, to the surface made basic of the support.

At the end of contacting, the solid support is washed.

In batch mode, generally the solid support is removed from the solution and washed.

In dynamic mode, the solid support is not removed from the solution but washed directly.

Washing consists in washing one or several times the solid support, for example 1 to 3 times, preferably with water.

This washing operation allows excess metal salt to be removed and a stable product to be obtained having a perfectly defined composition.

Drying is then optionally carried out, which is possible but not necessary.

The solid support that has reacted with the $M^{n+}$ metal cation as described above is then placed in contact with a solution of a salt of $(M'(CN)_m)^{z-}$, e.g. a salt of formula $Alk_z[M'(CN)_m]$, more preferably a solution of a salt of formula $K_z[M'(CN)_m]$; and also of a salt of an alkali metal Alk.

The alkali metal Alk may be selected from among Li, Na, and K, preferably Alk is K.

The alkali metal salt is different, distinct from the salt of $(M'(CN)_m)^{z-}$ that is also contained in the solution.

The alkali metal salt can be selected for example from among the nitrates, sulfates and halides (chlorides, iodides, fluorides) of an alkali metal Alk, such as potassium nitrate.

Advantageously, the solvent of this solution is water and preferably ultra-pure water.

The contacting, which can also be termed impregnation of the solid support, is generally conducted at ambient temperature and generally lasts 2 to 96 hours.

This contacting may be performed in static or batch mode preferably under agitation, in which case it generally lasts from 12 to 96 hours, or else in dynamic mode in which case it generally lasts from 2 to 24 hours.

The $(M'(CN)_m)^{z-}$ salt generally meets the following formula:

$(Alk)_z[M'(CN)_m]$, where M', m and z have the meaning already given above, and Alk is a monovalent cation selected from among the cations of alkali metals Alk such as K or Na, more preferably the $(M'(CN)_m)^{z-}$ salt meets the following formula: $K_z[M'(CN)_m]$, for example $K_4Fe(CN)_6$.

The concentration of the salt of an alkali metal in the solution is generally 0.001 to 1 mol/L, preferably 0.001 to 0.05 mol/L.

Advantageously, the concentration of the $(M'(CN)_m)^{z-}$ salt, and the concentration of the salt of an alkali metal are the same.

Also, the solution of the $[M'(CN)_m]^{z-}$ salt employed is generally prepared so that the weight ratio of the salt to the quantity of impregnation support constituted by the initial solid support is preferably 0.1 to 5 mmol/g of solid support.

In this manner, the fixation, immobilization is obtained of the $[M'(CN)_m]^{z-}$ anionic portion, for example $[Fe(CN)_6]^{4-}$ of the $[M'(CN)_m]^z$ salt e.g. of formula $Alk_z[M'(CN)_m]$, on the $M^{n+}$ cations and simultaneous insertion of the alkali metal in the structure of the crystal. This fixation, immobilization occurs via formation of bonds of covalent type which are relatively strong depending on the medium, and this fixation, immobilization is generally quantitative i.e. all the $M^{n+}$ cations react. Fixation, immobilization is therefore not at all random.

Alkali insertion in all the sites of the crystal structure is possible first through the optional presence of an alkali in the salt such as $Alk_z[M'(CN)_m]$, but above all through the additional presence of an alkali metal salt added to the impregnation solution.

This is why it is generally preferable that it is the same alkali metal Alk that is contained in the $[M'(CN)_m]Z$ salt, such as $Alk_z[M'(CN)_m]$, and in the alkali metal salt of the impregnation solution.

At the end of contacting, the solid support is washed.

In batch mode, the solid support is generally removed from the solution and then washed.

In dynamic mode, the solid support is not removed from the solution but is washed directly.

Washing consists in washing one or several times, for example 1 to 3 times, the support, preferably with the same solvent as the solvent of the complex solution, such as ultra-pure water.

The objective of this washing operation is to remove the salts of $[M'(CN)_m]^{z-}$ and the nanoparticles that have not been attached on the $M^{n+}$ cations, and allows a solid support to be obtained in which there no longer exists any free, non-bound $[M'(CN)_m]^{z-}$ which could be released.

The succession of contacting steps of the solid support with the $M^{n+}$ metal cation and washing steps (one or more times), followed by contacting of the solid support with a solution containing a $[M'(CN)_m]^{z-}$ salt, e.g. a salt of $[M'(CN)_m]^{3-}$, and a salt of an alkali metal, then washing (one or several times), may only be performed once, or else it can be repeated, generally 1 to 10 times, for example 1 to 4, 5, 6 or 7 times; it is therefore possible to perfectly adjust the extraction capacity of the material according to the invention.

The weight content of mineral fixer, immobilizing agent e.g. of hexacyanoferrate of insoluble metal and of alkali metal of formula $[Alk^+_x]M^{n+}[M'(CN)_m]^{z-}$ is generally 1 to 10% relative to the weight of the solid support.

The invention will now be described with reference to the following examples given for illustration and nonlimiting.

EXAMPLES

Example 1

In this example, it is shown how the surface of dry, crude silica may be made basic.

(1) Determination of the pH of Dry, Crude Silica

To determine the pH of dry, crude silica, a few grams of dry crude silica not having undergone any pre-treatment, were placed in contact with a few drops of Bromothymol Blue.

The different possible forms of Bromothymol Blue, and the different colours that can be exhibited by Bromothymol Blue depending on pH are indicated in Table 1 below.

TABLE I

| Colours of Bromothymol Blue | | | | |
| --- | --- | --- | --- | --- |
| acid form 1 | colour change range | acid form 2 | colour change range | basic form |
| magenta | about pH 0 | yellow | pH 6.0 to pH 7.6 | blue |

It was visually observed that dry crude silica not subjected to any pre-treatment and placed in contact with a few drops of Bromothymol Blue displays a yellow colour.

This yellow colouring shows that the pH of dry crude silica is lower than 6.

(2) Pre-Treatment of Silicas—Preparation of Pre-Treated Silicas Having their Surface Made Basic by Contacting with Basic Solutions of KOH.

Pre-treatment of crude silica was carried out to determine whether it is possible to make the surface thereof basic.

This pre-treatment step therefore consists in:
Preparing a highly concentrated basic solution of KOH at a very high pH of 14.
Adding, dropwise, this basic KOH solution of pH 14 thus prepared to three suspensions respectively containing the solid silica, continually monitoring the pH of the mixture of basic solution and dispersion. KOH reacts with the silica.

The adding of the basic solution was halted when the pH of the mixture of basic solution and dispersion reached a required, desired value and is stabilised at a required, desired basic value, namely respectively a value of 9 (pre-treated silica I), 10 (pre-treated silica II) or 11 (pre-treated silica III).

These pH values are called stabilised pH values at 9, 10 and 11 respectively.

(3) Measurement, Verification of the Surface pH of the Pre-Treated Silicas.

To verify the pH of the surface of the three pre-treated silicas I, II, and III, prepared as described above, a few grams of each of these different pre-treated and dried silicas I, II and III were placed in contact with another colour indicator specific to the basic pH range: Phenolphthalein.

It is recalled that Phenolphthalein is of pink colour in the pH range of 9 to 10, and is of a violet colour for a pH higher than 10.

The colours obtained after contacting each of the three pre-treated silicas I, II and III with Phenolphthalein were visually observed.

The different colours obtained show that the pre-treatment applied to the silica leads to an increase in the pH of the material, and hence of the surface.

After contacting with Phenolphthalein, the three pre-treated silicas displayed colours respectively corresponding to a pH of 10.8 (violet) for pre-treated silica III, to a pH of 10 (pink) for pre-treated silica II, to a pH of 9 (pale pink) for pre-treated silica I.

This example shows that it is possible to control the surface pH of silica depending on the pre-treatment conducted with a basic KOH solution, more exactly depending on the pH of the basic KOH solution used for pre-treatment of the silica.

Three silicas having a different surface pH (namely 10.8; 10; 9) depending on the pH of the basic KOH solution used for pre-treatment (namely 11; 10; 9 respectively) were able to be obtained as confirmed by the visual observations made.

Example 2

In this example, a material according to the invention was prepared by inserting nanoparticles of stoichiometric copper-potassium ferrocyanide within a gel of porous silica the surface of which had been made basic by successive contacting of this surface with a basic KOH solution of pH 9.

The caesium extraction capacity of this material was then measured.

Preparation of the Material According to the Invention.

In this example, the preparation method according to the invention was implemented on a support which is a commercial porous silica gel, in the form of granules of particle size 200-500 μm, pore size of 30 nm, and having a BET specific surface area of about 130 m²/g.

The operating mode for insertion of copper-potassium ferrocyanide ($K_2Cu(Fe(CN)_6)$) within this porous silica gel comprised following steps 1 and 2:

1. Modifying the silica surface to make it basic through successive contactings of this surface with a basic KOH solution.

1.1 $1^{st}$ contacting: About 10 g of silica gel (such as described above) were placed in contact with 250 mL of a KOH solution of pH 9. During this $1^{st}$ contacting, the pH of the solution that was initially 9 decreased immediately by two pH units. Agitation for 24 h followed by recovery of the solid by removing the supernatant.

1.2. $2^{nd}$ contacting with 250 mL of KOH solution of pH 9: the pH of the solution, initially of 9, decreased by about 1 pH unit. Agitation for 24 h, followed by recovery of the solid by removing the supernatant.

1.3. 3$^{rd}$ contacting with 250 mL of KOH solution of pH 9: the pH of the solution, after 24 h agitation, remained stable, and is pH 9. The solid was recovered by removing the supernatant, and then drying in air for 24 h.

2. Impregnation step with precursor solutions of copper-potassium ferrocyanides.

2.1. A first solution of copper nitrate ($Cu(NO_3)_2$) (of concentration $5 \cdot 10^{-2}$ mol/L in $Cu^{2+}$ (i.e. 3.2 g/L)) was prepared. The pH of this solution was 4.5.

1 g of silica gel modified as described in step 1 was placed in contact with 10 mL of this copper nitrate solution for 2 hours. The solid was then recovered and optionally rinsed with ultra-pure water. No drying step is required here.

At the end of this step, the copper was inserted in the silica in the form of mono- or polynuclear oxo-hydroxo species of hydrated copper, made possible by the basic nature of the silica surface. This synthesis route led to the insertion of a significant quantity of copper species within the silica gel as shown by the blue colouring of the support.

2.2. A second solution containing potassium ferrocyanide and potassium nitrate each at a concentration of $10^{-1}$ mol/L was prepared.

1 g of copper-loaded silica gel was placed in contact with 10 mL of this solution for 2 hours. This step led to the formation of stoichiometric copper-potassium ferrocyanide with a potassium ion in the cages of the structure. The solid was recovered, and optionally rinsed with ultra-pure water.

The contacting with ($Cu(NO_3)_2$) and then ($K_4Fe(CN)_6$ + $KNO_3$) is called the «impregnation cycle». This impregnation cycle is repeated twice, whereby the desired material according to the invention is obtained.

Extraction capacity is directly related to the number of impregnation cycles performed (see Example 2), and it is therefore possible to modulate this capacity very easily when synthesising the material.

The material is then rinsed with ultra-pure water and dried in air for 48 hours.

Measurement of the Caesium Extraction Capacity of the Material According to the Invention Prepared Above.

Measurement of the extraction capacity vis à vis Cs of the material according to the invention, prepared as described above with 2 impregnation cycles, was carried out by using the so-called standard test on a 100 mg/g caesium nitrate solution.

50 mg of the material according to the invention prepared as described above were placed in 50 mL of this 100 mg/g caesium nitrate solution for about twenty hours. Analysis of Cs concentration was performed in the initial and final solutions to evaluate the adsorption capacity of the material. This adsorption capacity is expressed as follows:

$$Q_e = ([Cs]_i - [Cs]_f) \frac{V}{m}$$

where $[Cs]_i$ and $[Cs]_f$ are the initial and final Cs concentrations respectively, analysed by atomic adsorption; V is the volume of solution used and m is the mass of material used.

The measured capacity in this example for the material according to the invention prepared as described above was 12 mg/g.

Example 3

In this example, a material according to the invention was prepared by inserting nanoparticles of stoichiometric copper-potassium ferrocyanide within a porous silica gel having one surface made basic by contacting this surface with a basic KOH solution the pH of which was continuously monitored and adjusted.

The caesium extraction capacity of this material was then measured.

Preparation of the Material According to the Invention

In this example, the preparation method according to the invention was implemented with the same support as in Example 2, but adjustment of pH at step 1 was controlled. The effect of the number of impregnation cycles on the properties of the material was also studied.

Modification of the Silica Surface to Make it Basic by Controlled Addition of a Basic KOH Solution.

About 5 g of silica gel (such as described above) were placed in contact in a beaker with 250 mL of a KOH solution of pH 10. For agitation a stirring blade was used directly in the beaker. The pH of the solution was monitored in-line using a pH meter and the pH was stabilised at 10 through successive additions of a mother KOH solution of pH 13. After stabilisation of the pH of the solution at 9.3 (hence after the addition of 18 mL of KOH solution of pH 13), corresponding to a test time of about 1.5 h, the supernatant was removed and the impregnation steps (2) performed.

Impregnation Step with Precursor Solutions of Copper-Potassium Ferrocyanides.

A first solution of copper nitrate ($Cu(NO_3)_2$) (of concentration $10^{-1}$ mol/L in $Cu^{2+}$ (i.e. 6.4 g/L)) was prepared.

5 g of modified silica gel such as described in step 1 were placed in contact with 10 mL of this copper nitrate solution for 2 hours. The solid was then recovered and optionally rinsed with ultra-pure water. No drying step is necessary here. At the end of this step, analysis of the copper solution before and after contacting showed incorporation of Cu in the silica gel of approximately 0.5 weight % of Cu (5 mg of Cu per g of solid).

Then, as previously, a second solution containing potassium ferrocyanide and potassium nitrate at concentrations of $10^{-1}$ Mol/L was prepared.

5 g of copper-loaded silica gel were placed in contact with 10 mL of this solution. This step led to the formation of stoichiometric copper-potassium ferrocyanide with a potassium ion in the cages of the structure.

Contacting with ($Cu(NO_3)_2$) and then ($K_4Fe(CN)_6$ + $KNO_3$) is called the «impregnation cycle». This impregnation cycle is repeated once or twice. After each impregnation cycle, a small amount of material is sampled to measure the Cs extraction capacity and to study the effect of the number of cycles on the properties of the material.

Measurement of the Extraction Capacity Vis a Vis Caesium of the Material According to the Invention Prepared Above, as a Function of the Number of Impregnation Cycles.

This extraction capacity was measured in identical manner to the description in Example 1.

Cycle 1: the measured capacity was 15.76 mg/g

Cycle 2: the measured capacity was 18.14 mg/g

No trace of Cu, Fe was found by ICP-AES analysis of the 2 corresponding final solutions of caesium nitrate (the content of these elements was therefore below the detection limit).

It therefore appears that a single impregnation cycle is sufficient to reach satisfactory extraction capacities. This point is of importance to reduce production costs by limiting steps and hence reducing production time.

Example 4

In this example, a material according to the invention was prepared by inserting nanoparticles of stoichiometric copper-potassium ferrocyanide in a porous silica gel. However, 100 g of silica gel were used instead of 5 g or 10 g to evaluate the effect, on this synthesis route, of the change in scale in the starting quantity of silica gel, with a view to industrialization.

The extraction capacity vis à vis caesium of this material was then measured.

Preparation of the Material According to the Invention.

100 g of silica gel were placed in contact with 250 mL of a solution having an initial pH of 9 which was adjusted with KOH. The pH was continuously measured, the suspension being agitated with a stirring blade. The pH was then continuously adjusted through the addition of a solution of KOH of pH 13, until the pH became stable at 9.5. This test lasts a time of approximately one to two hours.

At the end of this step, the supernatant was removed.

The impregnation steps were then carried out as described in the preceding examples with 3 impregnation cycles.

Measurement of Extraction Capacity Vis a Vis Caesium of the Material According to the Invention, Prepared Above, as a Function of the Number of Impregnation Cycles.

The extraction capacity was measured between each cycle.

The measured extraction capacities were the following:

Cycle 1: 13.81 mg/g
Cycle 2: 18.01 mg/g
Cycle 3: 34.4 mg/g

No trace of Cu, Fe was found by ICP AES analyses on these 3 corresponding final solutions of caesium nitrate (the content of these elements was therefore lower than the detection limit).

These results validate the possible production of the material according to the invention on a larger scale than in Examples 2 and 3, namely 100 g under «mild» condition only having recourse to water as solvent and with rapid synthesis times, namely about 6 hours for a complete cycle.

Example 5

In this example the caesium extraction and adsorption kinetics by the material according to the invention prepared in Example 4 were studied, and a caesium extraction test by the material according to the invention prepared in Example 4 was carried out in a column.

Kinetic Tests

With a view to use this material in a column, kinetic tests were carried out on the material prepared in Example 4.

These kinetic tests consist in placing 50 mg of material into contact with 50 mL of effluent, under agitation, for different times.

Each kinetic point corresponds to one measurement of the extraction capacity for one contact time.

The initial solution was a solution of ultrapure water in which 100 mg/L of Cs were dissolved in the form of $CsNO_3$. The Cs in the initial solution and final solutions was analysed by atomic adsorption spectroscopy. The kinetic results are given in FIG. 1.

Figure 1:
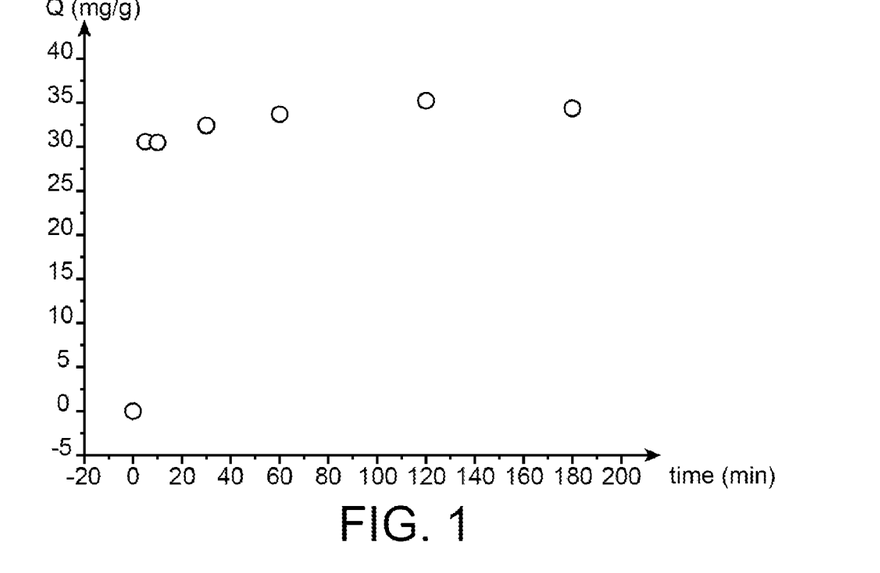
FIG. 1 is a graph giving the adsorption capacity Q of caesium (in mg/g) of the material prepared in Example 3, as a function of time (in minutes), during the kinetic tests carried out in Example 5.

FIG. 1 shows that the adsorption kinetics are extremely rapid (a few minutes).

In addition, analyses of K in solution show total exchange between the K of the solid and the Cs of the solution, with no release salting-out of Cu, Fe or Si.

Tests in Column

The properties of the material prepared in Example 4 were evaluated by determining a breakthrough curve.

For this purpose, 2 g of material prepared in Example 4 were placed in a column of diameter 1 cm. This amount of material corresponded then to a column height of 5 cm.

Figure 2:
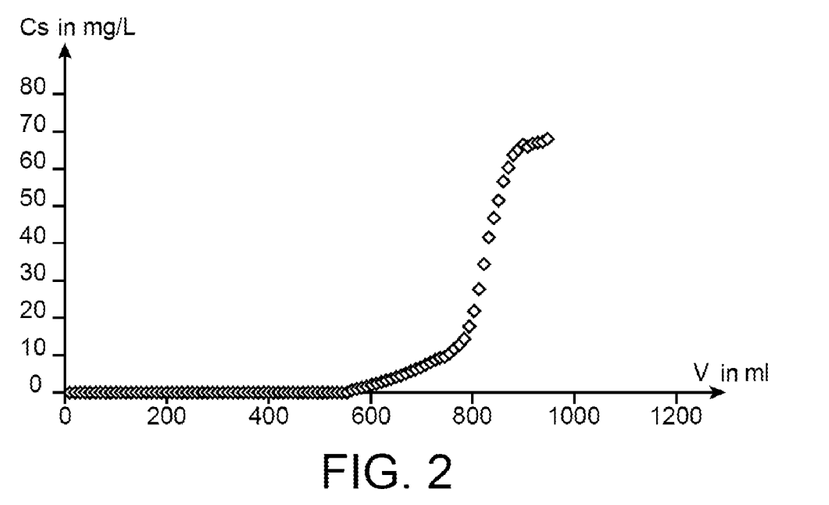
FIG. 2 is a graph giving the breakthrough curve obtained in Example 5 with the material prepared in Example 4.

A solution containing 70 mg/L of Cs in the form of $CsNO_3$ was passed through the column at a flow rate of 160 mL/h, corresponding to a linear velocity of 2 m/h, and the concentration at the outlet of the column was measured by atomic adsorption spectroscopy at regular intervals. A breakthrough curve was thus obtained. This breakthrough curve is illustrated in FIG. 2.

The profile of this breakthrough curve is of particular interest since it shows that this material is well suited, in fixed bed form, for implementation in an industrial Cs extraction process.

Example 6

In this example, a material according to the invention was prepared by insertion of nanoparticles of stoichiometric nickel-potassium ferrocyanide in a porous silica gel having its surface made basic through successive contacting of this surface with a basic KOH solution of pH 9.

The extraction capacity vis à vis caesium of this material was then measured.

This objective of this example was to validate the possible extension of the synthesis method to other types of ferrocyanide.

In this example it was therefore sought to obtain a material containing nickel-potassium ferrocyanides, known to have good extraction efficiency vis à vis caesium in an acid medium.

Preparation of the Material According to the Invention.

The step to modify the surface of the silica gel support with a basic solution was the same as described in Example 2.

The impregnation step differed in that the copper salt was replaced by a nickel salt at the first impregnation phase. A first solution of nickel sulfate ($Ni(SO_4)_2$) was therefore prepared ($Ni^{2+}$ concentration $10^{-1}$ mol/L).

1 g of «basified» silica gel was placed in contact with 10 mL of this nickel sulfate solution for 2 hours. The solid was then recovered and rinsed with ultrapure water. No drying was required here. Then, in Example 2, a second solution was prepared containing potassium ferrocyanide and potassium nitrate, each at a concentration of $10^{-1}$ Mol/L. 1 g of nickel-loaded silica was placed in contact with 10 mL of this solution. This step led to the formation of stoichiometric nickel-potassium ferrocyanide with a potassium ion in the cages of the structure. This impregnation cycle was repeated 3 times and the extraction capacity was then measured.

Measurement of the Extraction Capacity Vis a Vis Caesium of the Material According to the Invention Prepared Above, after 3 Impregnation Cycles.

This extraction capacity was measured in the same manner as described in Example 2.

Cycle 3: the measured capacity was 48 mg/g.

Analysis of the potassium released by the material corresponded to pure Cs<->K exchange. The concentration of Ni and Fe was below the detection limit.

The synthesis method of the invention may therefore be used for other types of ferrocyanide, such as nickel-potassium ferrocyanide, leading to a material in which exchange with Cs takes place solely with the potassium of the structure.

REFERENCES

[1] WO-A2-2010/133689.

[2] H. Mimura, M. Kimura, K. Akiba, Y. Onodera, «*Selective removal of cesium from highly concentrated sodium nitrate neutral solutions by potassium nickel hexacyanoferrate(II)-loaded silica gels*», solvent extraction and ion exchange, 17(2), 403-417, (1999).

[3] L. Sharigyn, A. Muromskiy, M. Kalyagina, S. Borovkov, "*A granular inorganic cation-exchanger selective to cesium*", J. Nuclear Science and Technology, 44 (5), 767-773, (2007).

[4] Sanhita Chaudhury, A. K. Pandey; A. Goswami, «*Copper ferrocyanide loaded track etched membrane an effective cesium adsorbent*», J. Radioanal. Nucl. Chem 204 (2015) 697-703.

[5] WO-A1-2016/038206.

What is claimed is:

1. Solid nanocomposite material comprising nanoparticles of a hexacyanometallate or octacyanometallate of an alkali metal, and of a transition metal, having formula $[Alk^+_x]M^{n+}[M'(CN)_m]^{z-}$ where Alk is an alkali metal, x is 1 or 2, M is a transition metal, n is 2 or 3, M' is a transition metal, m is 6 or 8, z is 3 or 4, attached to at least one surface of a solid inorganic porous support, wherein the nanoparticles are attached by adsorption to said at least one surface of the solid support, and wherein said surface is a basic surface.

2. The material according to claim 1, wherein the material has a nanoparticles content of 1 mass % to 20 mass % relative to the mass of the solid support.

3. The material according to claim 1, wherein $M^{n+}$ is $Fe^{2+}$, $Ni^{2+}$, $Fe^{3+}$, $Co^{2+}$, $Cu^{2+}$ or $Zn^{2+}$.

4. The material according to claim 1, wherein M' is $Fe^{2+}$ or $Fe^{3+}$ or $Co^{3+}$, and m is 6; or else M' is $Mo^{5+}$, and m is 8.

5. The material according to claim 1, wherein Alk is Li, Na or K.

6. The material according to claim 1, wherein $[M'(CN)_m]^{z-}$ is $[Fe(CN)_6]^{3-}$, $[Fe(CN)_6]^{4-}$, $[Co(CN)_6]^{3-}$ or $[Mo(CN)_6]^{3-}$.

7. The material according to claim 1, wherein the $M^{n+}$ cations are $Ni^{2+}$, $Cu^{2+}$, $Fe^{2+}$ or $Fe^{3+}$ cations and the $[M'(CN)_m]^{z-}$ anions are $[Fe(CN)_6]^{3-}$ or $[Fe(CN)_6]^{4-}$ anions.

8. The material according to claim 1, wherein the $M^{n+}$ cations are $Fe^{3+}$ cations and the $[M'(CN)_m]^{z-}$ anions are $[Mo(CN)_8]^{3-}$ anions.

9. The material according to claim 1, wherein the $M^{n+}$ cations are $Co^{2+}$ or $Ni^{2+}$ cations and the $[M'(CN)_m]^{z-}$ anions are $[Co(CN)_6]^{3-}$ anions.

10. The material according to claim 1, wherein the nanoparticles have the formula $K[Cu^{II}Fe^{III}(CN)_6]$ or $K_2[Cu^{II}Fe^{II}(CN)_6]$ or $K[Ni^{II}Fe^{III}(CN)_6]$ or $K_2[Ni^{II}Fe^{II}(CN)_6]$.

11. The material according to claim 1, wherein the nanoparticles have the form of a sphere or of a spheroid.

12. The material according to claim 1, wherein the nanoparticles have a diameter of 3 nm to 30 nm.

13. The material according to claim 1, wherein the support comprises a material selected from metal oxides; metalloid oxides; mixed oxides of metals and/or metalloids; metal aluminosilicates; metal silicates; metal titanates; metal carbides; metalloid carbides; mixtures of metal oxides and/or metalloid oxides, and/or of mixed oxides of metals and/or metalloids; glasses; carbons; and composite materials comprising two or more materials among the aforementioned materials.

14. The material according to claim 13, wherein the metal oxides are selected from the group consisting of transition metal oxides and mixtures thereof;

wherein the metalloid oxides are selected from the group consisting of silicon oxides and mixtures thereof;

wherein the metal silicates are selected from the group consisting of zirconium silicates, tin silicates, cerium silicates, and compounds of mullite type (aluminium silicate) and cordierite type (aluminous ferromagnesian silicate);

wherein the metal titanates are selected from the group consisting of tialite, metalloid titanates and mixtures thereof;

wherein the glass is selected from the group consisting of borosilicate glasses;

and wherein the carbons are selected from the group consisting of graphite, fullerenes and mesoporous carbons.

15. The material according to claim 1, wherein the support is in a form selected from particles, wherein the particles are selected from the group consisting of granules, beads, fibres, tubes, plates and flakes; membranes; felts; and monoliths.

16. The material according to claim 15, wherein the support is in the form of a powder consisting of particles with a particle size of 0.5 mm to 1 mm.

17. The material according to claim 16, wherein the particles are beads.

18. The material according to claim 1, wherein the support has a BET specific surface area of 5 to 500 $m^2/g$.

19. Method for preparing the solid nanocomposite material according to claim 1, wherein the following successive steps are carried out:

a) a solid support is provided;

b) at least one surface of the solid support is made basic;

c) the solid support of which at least one surface has been made basic is placed in contact with a solution containing the $M^{n+}$ ion, then the solid support obtained is washed one or several times with water and optionally dried;

d) the solid support obtained at the end of step c) is placed in contact with a solution containing a salt of $[M'(CN)_m]^{z-}$, and a salt of an alkali metal Alk, then the solid support thus obtained is washed one or several times with water and optionally dried;

e) steps c) to d) are optionally repeated;

f) if steps c) and d) are the last steps of the method, then during step c) the solid support obtained is washed one or several times with water, and during step d) the solid support thus obtained is washed one or several times and dried.

20. The method according to claim 19, wherein, during step b), at least one surface of the solid support is placed in contact one or several times with at least one basic solution until the pH value of the basic solution in contact with the surface is stabilised, stable, and remains stable at a desired basic value, whereby a solid support is obtained having at least one surface that has been made basic, the solid support is then separated from the basic solution, and the solid support having at least one surface that has been made basic is optionally dried.

21. The method according to claim 19, wherein the solution containing a salt of $(M'(CN)_m)^{z-}$ and a salt of an alkali metal Alk, is an aqueous solution.

22. The method according to claim 21, wherein the salt of $(M'(CN)_m)^{z-}$ is a salt of formula $[Alk_z][M'(CN)_m]$.

23. The method according to claim 19, wherein steps c) and d) are performed in static or batch mode, or in dynamic mode.

24. The method according to claim 23, wherein steps c) and d) are performed in a column.

25. The method according to claim 24, wherein when steps c) and d) are performed in the same column.

26. The method according to claim 19, wherein steps c) and d) are repeated 1 to 10 times.

27. The method according to claim 19, wherein the salt of $[M'(CN)_m]^z$ is a salt of formula $[Alk_z]$ $[M'(CN)_m]$.

28. Method for extracting at least one metal cation from a liquid medium in which it is contained, wherein said liquid medium is placed in contact with the material according to claim 1.

29. The method according to claim 28, wherein said liquid medium is an aqueous liquid medium.

30. The method according to claim 29, wherein the aqueous liquid medium is seawater or a brackish water.

31. The method according to claim 28, wherein said liquid medium is a liquid medium containing radionuclides.

32. The method according to claim 28, wherein the liquid medium is an aqueous solution which, additionally to said metal cation, contains salts.

33. The method according to claim 32, wherein said salts are present at a concentration higher than 30 g/L.

34. The method according to claim 28, wherein said metal cation is contained at a concentration of 0.1 picogram to 100 mg/L.

35. The method according to claim 28, wherein the metal cation is a cation of an element selected from among Cs, Co, Ag, Ru, Fe and Tl and their isotopes thereof.

36. The method according to claim 35, wherein the metal cation is a cation of $^{134}Cs$ or $^{137}Cs$.

37. The method according to claim 28, wherein the liquid medium is an aqueous solution containing, as the metal cation, a cation of $^{134}Cs$ or $^{137}Cs$, and additionally containing salts at a concentration higher than 30 g/L.

38. The material according to claim 1, wherein the support consists of a material selected from metal oxides; metalloid oxides; mixed oxides of metals and/or metalloids; metal aluminosilicates; metal silicates; metal titanates; metal carbides; metalloid carbides; mixtures of metal oxides and/or metalloid oxides, and/or of mixed oxides of metals and/or metalloids; glasses; carbons; and composite materials comprising two or more materials among the aforementioned materials.

* * * * *